United States Patent [19]
Liu

[11] Patent Number: 5,157,425
[45] Date of Patent: Oct. 20, 1992

[54] EYEGLASS RETAINER HAVING FRICTION INCREASING MEANS

[75] Inventor: Rick Liu, Wilson, Wyo.

[73] Assignee: Life-Link International, Inc., Jackson, Wyo.

[21] Appl. No.: 684,601

[22] Filed: Apr. 12, 1991

[51] Int. Cl.$^5$ .............................. G02C 3/00
[52] U.S. Cl. .............................. 351/156; 351/157; 24/3 C
[58] Field of Search .............. 351/123, 156, 157; 24/3 C; 2/452

[56] References Cited

U.S. PATENT DOCUMENTS

| | | | |
|---|---|---|---|
| 4,133,604 | 1/1979 | Fuller | 351/123 |
| 4,541,696 | 9/1985 | Winger | 351/156 |
| 4,657,364 | 4/1987 | Murrell | 351/123 |
| 5,087,118 | 2/1992 | Gill | 351/157 |

*Primary Examiner*—Rodney B. Bovernick
*Attorney, Agent, or Firm*—Andrew D. Maslow

[57] ABSTRACT

An eyeglass retainer comprising a band with tubular members at each end made of an elastic material, the tubular members being lined with a primary surface lining material and friction means being fixed to the tubular members and extending into the interior space of the tubular members.

8 Claims, 1 Drawing Sheet

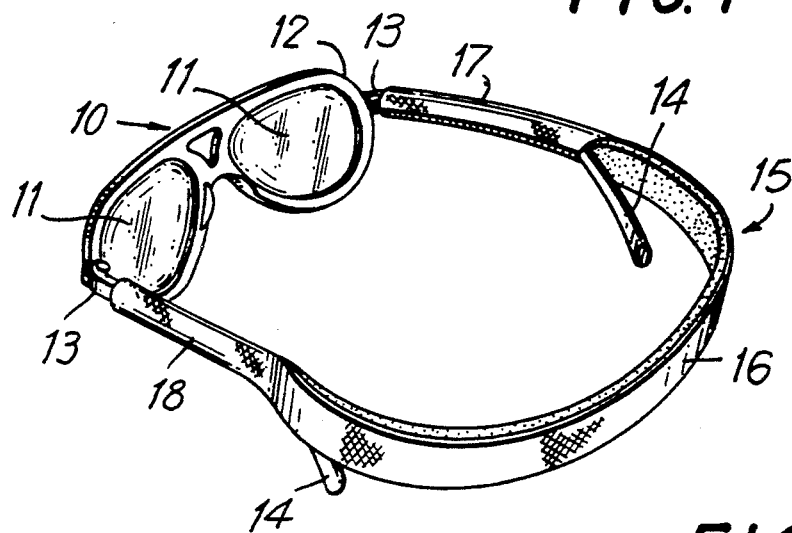
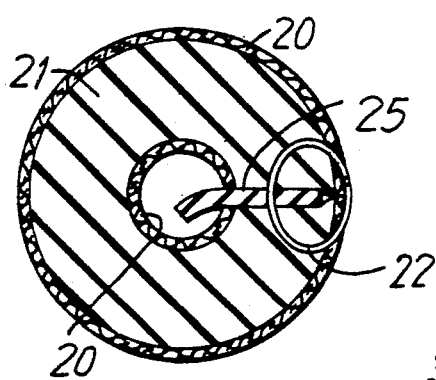
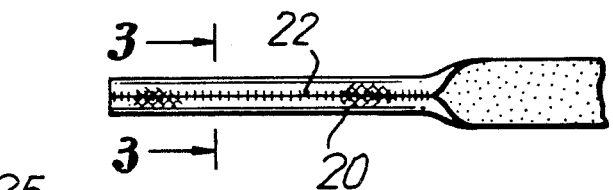
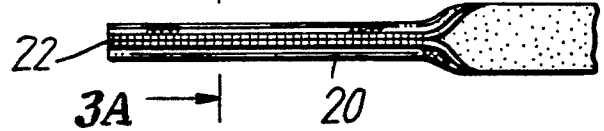
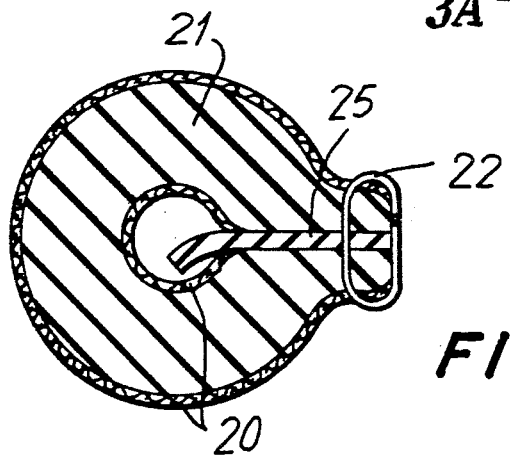

EYEGLASS RETAINER HAVING FRICTION INCREASING MEANS

BACKGROUND OF THE INVENTION

1. Field of the Invention

This invention relates to eyeglass retainers used to secure a pair of eyeglasses to the head of the wearer. In particular, the invention relates to an improved eyeglass retainer that grips the temples of the eyeglass more securely.

2. Description of the Prior Art

In the prior art various retainers for eyeglasses have been advanced which hold eyeglasses through the use of a band around the head. Theses devices have worked well in many instances but sometimes fail to be both comfortable and securely hold the eyeglasses in position for use.

U.S. Pat. No. 4,133,604 discloses the current basic state of the art eyeglass retainer which is comfortable and securely holds the eyeglasses in position. This patent discloses the use of a unitary piece of a foam material which has been formed into tubes at both ends. The inner portion of the tubes is lined with an elastic woven material. The tubes grip the temples of the eyeglass retainer through an action similar to a "chinese finger trap" wherein a tension placed on the tube will tighten it down or tend to make it of smaller diameter, while compression will tend to extend it. However, this eyeglass retainer becomes less effective when the circumference of the temples of the eyeglass being held is reduced, such as in wire rimmed eyeglasses. Since the inner circumference of the tubes is fixed, this eyeglass retainer has the disadvantage of working effectively on a small range of sizes of temples. If the circumference of the inside of the tube is reduced, then the retainer will not fit easily or at all onto eyeglasses with large temples.

U.S. Pat. No. 2,481,946 illustrates a neck retainer for eyeglasses which has a small tubular member attached to a fabric strap which fits around the neck, and holds the glasses in position when the eyeglasses are actually off. The strap is to hold the glasses in place around a person's neck, rather than retain the glasses in a position during use.

A similar device is shown in U.S. Pat. No. 2,704,961 where a neck strap is utilized for retaining the eyeglasses in position when the eyeglasses are removed from the face and are supported around the neck.

A device for retaining eyeglasses comprising members that are designed to replace the normal eye supported bow pieces is shown in U.S. Pat. No. 1,819,738. In this patent, short temple pieces are utilized and an elongated band that fits around the back of the head is made of a resilient material and is fastened to the temples through tubular connectors. Suitable adjustment devices may be utilized with the eyeglass support, ant thus used to hold the eyeglasses in position on the face during use.

U.S. Pat. No. 3,450,467 illustrates an eyeglass retainer that grips the eyeglasses and attaches to the temple pieces or bows of the eyeglasses to hold the eyeglasses in position. A neck strap for supporting eyeglasses when removed is shown in U.S. Pat. No. 3,879,804 which illustrates a band that clips onto eyeglasses or goggles and will grip the eyeglasses or goggles through a tightening loop connection. A similar type device is shown in U.S. Pat. No. 3,874,776.

U.S. Pat. No. 3,502,396 illustrates a non-stretch adjustable eyeglass holder that fits behind the head during use and has a series of holes for a fastener that provides for adjustment of the length of the strap after the strap has been attached to the temples of the eyeglasses.

Other patents that disclose eyeglass retainers include U.S. Pat. Nos. 2,539,922, 4,657,364, 4,541,696 and 4,793,702. In the later patent the the inventors allege that by using a tape to form the tubes of the eyeglass retainer disclosed in U.S. Pat. No. 4,133,604, the tubes allegedly grip the temples of the eyeglass more securely than tubes made with a sewn seam.

None of the prior art patents disclose a comfortable eyeglass retainer that can securely grip many different sized temples of the eyeglasses with nearly equal strength.

SUMMARY OF THE INVENTION

The present invention relates to an eyeglass retainer for holding eyeglasses in position on the head during use. The device is made from an elastic or resilient material such as a foam and comprises a band having formed tubular members at opposite ends thereof. The tubular members are at a suitable distance apart from each other so that they may be placed on the temples of the eyeglasses and the band can extend around the head of the wearer. The tubular members are made of a size so that they will slip over the temples of eyeglasses and be frictionally retained. An additional piece of material is inserted and fixed inside the tubular members. This additional material has a higher coefficient of friction than that of the primary lining of the interior of the tubular members. Adjustment of the force holding the eyeglasses is made by sliding the tubular members along the temples to a desired position.

In the preferred form of the invention the band will be made of a closed cell neoprene foam material covered with a woven cloth material that adheres to the neoprene and is held is place across the entire neoprene surface. The material may be foam backed Nylon Tricot. The additional piece of material may be a thin strip of rubber which is sewn into the tubular members so that the surface of the rubber forms part of the lining of the tubular members. The fabric material is placed of the interior of the tubular members formed for sliding over the temples or bow pieces of the eyeglasses and, when the band that goes around the head is placed under tension, the woven material will tend to tighten down on the temples or bow pieces of the eyeglasses and the secondary lining rubber material will serve to increase the holding power even further. The action of retention of the tubular members is similar to that which occurs with a "chinese finger trap". When a tension is placed on the tube of woven material and secondary lining rubber material the tube will tighten and it will tend to decrease in diameter, while compression of the tubular member will tend to extend the diameter and loosen the grip of the tube on the temples or bows of the eyeglasses being retained.

Both sides of the elastic band can be covered with material if desired. It is important that the interior of the tubular members have a primary lining with a coefficient of friction sufficiently low enough to allow the temples or bows of the eyeglasses to be inserted in the tubes without too much difficulty. It is also important that the secondary lining material have a higher coefficient of friction than the primary lining surface of the tubular members. Preferably, the coefficient of friction of the secondary lining material is sufficiently high so that if it were used as the primary lining of the tubular members, it would be difficult to slide the tubular members on the temples or bows of the eyeglasses to be retained.

The band is placed around the head behind the ears, thereby holding the eyeglasses in position under a slight tension. The device is not primarily designed as a neck strap for supporting eyeglasses when removed from the eyes, although it may be used as such if desired. In such case it would be advantageous to extend the length of the band between the tubular members.

When the band is in position, it can be adjusted to exert a tension directly back rearwardly on the eyeglasses themselves without exerting any downward pressure on the glasses and thus it holds the glasses comfortably and securely. The secondary lining material provides extra friction so as to exert greater tension on the temples of the eyeglasses without sacrificing the ease of inserting the tubular members on the temples of the eyeglasses. The secondary lining material also allows the eyeglass retainer to hold eyeglasses with temples or bows of a narrow diameter such as are often found with wire rimmed eyeglasses. The eyeglasses can be pushed up to the forehead and held in position with the band remaining around the wearers head behind the ears. The device is intended for uses at any time but is especially useful for a wearer who is engaged in physical activity.

It is an object of the invention to provide an improved eyeglass retainer which is comfortable and securely grips the temples of the eyeglasses.

Another object of the invention is to improve the holding power of the eyeglass retainer without making it difficult to place the eyeglass retainer on the temples of the eyeglasses to be held in place.

A further object of the invention is to provide a one size an eyeglass retainer that is capable of securely holding a wide variety of eyeglasses on the wearers head during physical activity.

Another object of the invention is to provide a means for varying the tackiness of the material used to line the tubes of the eyeglass retainer without increasing the cost of the product.

Still other objects and advantages of the invention will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

FIG. 1 is a perspective view illustrating the eyeglass retainer of the invention installed upon eyeglasses;

FIG. 2 is fragmentary side view of a retainer band end portion which fits over the temples of the eyeglasses as shown in FIG. 1 and which contains tubes made with a butt seam.

FIG. 2A is fragmentary side view of a retainer band end portion which fits over the temples of the eyeglasses as shown in FIG. and which contains tubes made with a lap seam.

FIG. 3 is a sectional view taken generally on line 3—3 in FIG. 2 with the eyeglass temples removed;

FIG. 3A is a sectional view taken generally on line 3A—3A in FIG. 2A with the eyeglass temples removed;

DETAILED DESCRIPTION OF THE DRAWINGS

Referring to FIG. 1, a pair of eyeglasses illustrated generally at 10 is shown with lenses 11, 11, a main frame 12 for the lenses, and temples or bow pieces indicated generally at 13, 13 hingedly attached to the main frame of the eyeglasses in the normal manner. Temples 13 have ear retainers 14, as shown on one side of FIG. 1, and a retainer strap made according to the present invention illustrated at 25 is slipped onto the temples of the eyeglasses.

The retainer strap 15 comprises a flat strap member 16, a first tubular member 17, and a second tubular member 18 at opposite ends of the strap. The first and second tubular members 17 and 18 are formed by either a butt seam as shown in FIG. 2 or a lap seam as shown in FIG. 2A. The seams may be either sewn, glued or taped. In the preferred embodiment the seams are sewn with thread 22. An insert 25 which is a strip of material is fixed to the interior of the tubular members at the seam. The insert forms a secondary lining of the tubular member its surface area is less than that of the full interior surface area of the tubular member. The insert has a higher coefficient of friction that the primary lining of the interior of the tubular members. The insert may be butyl rubber, latex, neoprene, Kraton and the like. It can be seen that by varying the tackiness of the insert the grip on the temples of the eyeglass to be held in place can be adjusted. The strength of the grip of the insert is relative to the surface area of the rubber material in contact with the temples of the eyeglasses. It should be noted that the insert is not in the form of a tube so that its relative contribution to the grip diminishes as the tubular member is stretched. This gives the eyeglass retainer the advantage of increasing the grip on small diameter temples without increasing the difficulty of putting them on temples with a larger size diameter.

The rubber insert also causes increased grip on one side of the temple only. This causes an asymmetry when the eyeglass retainer is being pulled of the temples. This lack of balance increases the effective grip by causing the eyeglass retainer "jam" in the process of being taken off the temples of the eyeglasses.

The strap itself is made of a piece of resilient or elastic material such as closed cell neoprene foam 21, which is the preferred foam, or some other suitable resilient material. In the preferred embodiment the foam is covered with a fabric layer such as Nylon Tricot on the interior side shown in FIGS. 2 and 2A. When the tubular members 17 and 18 are formed the interior of the formed tubes will be lined with a fabric material as generally indicated at 20 in FIG. 3.

The retainer is utilized by slipping the tubular members 17 and 18 over the temples of the eyeglasses, and adjusting the tubular portion so the flat band portion 16 is under sufficient tension around the back of a user's head to hold the eyeglasses under light tension rearwardly on the nose and adjacent the eyes during use.

It should be noted that in adjustment, the tubular members 17 and 18 may be slid along the temples because of the lower coefficient of friction of the lining of the tubular members (the fabric backing in the case of the preferred embodiment). As tension is exerted from the flat portion 16, which tends to pull on the tubular members, the interior lining of the tubular members tends to elongate and tighten down on the temples of the eyeglass retainer. The rubber insert however, not being in the form of a tube, does not tighten in this manner similar to that of the so called "chinese finger trap." The different tension adjustment positions can be seen in FIG., 1 where tubular member 17 has been slid all the way to the hinge of the temple and tubular member 18 is retracted slightly.

It will thus be seen that the objects set forth above, among those made apparent from the preceding description, are efficiently attained and, since certain changes may be made in carrying out the above eyeglass retainer without departing from the spirit and scope of the invention, it is intended that all matter contained in the above description and shown in the accompanying drawings shall be interpreted as illustrative ant not in a limiting sense.

It is also to be understood that the following claims are intended to cover all of the generic and specific features of the invention herein described, and all statements of the scope of the invention which is a matter of language might be said to fall therebetween.

What is claimed is:

1. In an eyeglass retainer comprising a band of material, means at opposite ends of said band forming tubular members being open at both ends, said tubular members comprising an elastic material, the interior of said tubular members being lined with a primary surface lining material, the tubular members being of a size to slip over the temples of eyeglasses to be retained, the improvement comprising friction increasing means for increasing the friction applied to the temple members of the glasses to be retained, said friction increasing means being fixed to the tubular members and extending into the interior space of the tubular members; said friction increasing means comprising a secondary lining material having a coefficient of friction greater than that of the primary surface lining material.

2. The eyeglass retainer of claim 1 wherein said friction increasing means comprises a strip of rubber.

3. The eyeglass retainer of claim 1 wherein said elastic material has a fabric backing on at least one side thereof and which lines the majority of the interior of the tubular members.

4. The eyeglass retainer of claim 1 wherein the elastic material is an elastomeric foam.

5. The eyeglass retainer of claim 1 wherein the fabric is a woven Nylon Tricot material.

6. The eyeglass retainer of claim 2 wherein said elastic material has a fabric backing on at least one side thereof and which lines the majority of the interior of the tubular members.

7. The eyeglass retainer of claim 6 wherein the elastic material is an elastomeric foam.

8. The eyeglass retainer of claim 6 wherein the fabric is a woven Nylon Tricot material.

* * * * *